US008117598B2

(12) United States Patent
Johnson et al.

(10) Patent No.: US 8,117,598 B2
(45) Date of Patent: Feb. 14, 2012

(54) METHOD AND APPARATUS TO AUTOMATICALLY IDENTIFY SPECIFIC CODE CHANGES TO PROBABILISTICALLY EXCLUDE FROM REGRESSION

(75) Inventors: Darrin P. Johnson, San Jose, CA (US); Damien Farnham, Dublin (IE); Fintan Ryan, Dublin (IE); Sean A. McGrath, Dublin (IE)

(73) Assignee: Oracle America, Inc., Redwood City, CA (US)

( * ) Notice: Subject to any disclaimer, the term of this patent is extended or adjusted under 35 U.S.C. 154(b) by 1174 days.

(21) Appl. No.: 11/862,908

(22) Filed: Sep. 27, 2007

(65) Prior Publication Data

US 2009/0089745 A1 Apr. 2, 2009

(51) Int. Cl.
G06F 9/44 (2006.01)
G06F 9/45 (2006.01)
(52) U.S. Cl. .................. 717/124; 707/126; 707/131
(58) Field of Classification Search .......... 717/124–131, 717/104–105
See application file for complete search history.

(56) References Cited

U.S. PATENT DOCUMENTS

| | | | | |
|---|---|---|---|---|
| 6,944,848 B2* | 9/2005 | Hartman et al. | ............... | 717/124 |
| 7,007,270 B2* | 2/2006 | Martin et al. | ............... | 717/131 |
| 7,216,339 B2* | 5/2007 | Simkins | ............... | 717/126 |
| 7,383,540 B2* | 6/2008 | Kalra | ............... | 717/129 |
| 7,441,236 B2* | 10/2008 | Chon et al. | ............... | 717/135 |
| 7,596,778 B2* | 9/2009 | Kolawa et al. | ............... | 717/126 |
| 7,634,761 B2* | 12/2009 | Buschardt et al. | ............... | 717/129 |
| 7,653,545 B1* | 1/2010 | Starkie | ............... | 704/275 |
| 7,711,914 B2* | 5/2010 | Thelen et al. | ............... | 711/163 |
| 7,716,649 B2* | 5/2010 | Clemm et al. | ............... | 717/128 |
| 7,752,502 B2* | 7/2010 | Clee et al. | ............... | 714/38.14 |
| 7,761,855 B2* | 7/2010 | Kalra | ............... | 717/129 |
| 7,810,081 B2* | 10/2010 | Dickenson et al. | ............... | 717/140 |
| 7,813,911 B2* | 10/2010 | Triou et al. | ............... | 703/22 |
| 7,840,944 B2* | 11/2010 | Brunswig et al. | ............... | 717/124 |
| 7,890,924 B2* | 2/2011 | Raffo | ............... | 717/105 |
| 7,926,036 B2* | 4/2011 | Nagappan et al. | ............... | 717/124 |
| 7,962,891 B2* | 6/2011 | Kimelman et al. | ............... | 717/104 |

OTHER PUBLICATIONS

Correa, "Towards automatic consistency preservation for model driven software product lines", ACM SPLC, pp. 1-7, 2011.*
Morasca, "A probablility based approach for measuring external attributes of software artifacts", IEEE, pp. 44-55, 2009.*
Dulz et al, "Calculating the usage probabilities of statistical usage models by constraints optimization", ACM AST, pp. 127-134, 2010.*
Zheng et al, "Fast estimation of probablities of soft deadline misses in layred software performance models", ACM WOSP, pp. 181-186, 2005.*

* cited by examiner

Primary Examiner — Anil Khatri
(74) Attorney, Agent, or Firm — Osha • Liang LLP

(57) ABSTRACT

Techniques for efficiently isolating software regressions are provided. In one embodiment, it is determined that a particular regression is present in a particular build of a software system. A set of candidate code components that may have caused the particular regression is identified. In accordance with an order established based on historical data for the software system, one or more intermediate builds each involving some subsets of the candidate code components may be tested to identify a set of suspect code components that caused the particular regression. For each candidate code component that is not in the set of suspect code component, a likelihood factor associated with that candidate code component is decremented.

17 Claims, 5 Drawing Sheets

METHOD AND APPARATUS TO AUTOMATICALLY IDENTIFY SPECIFIC CODE CHANGES TO PROBABILISTICALLY EXCLUDE FROM REGRESSION

BACKGROUND

In order to verify that software is functioning properly, the software must be adequately tested. Software testing is typically done after a threshold of change is reached to warrant the testing. Software testing may be performed during final integration of code or at intermediate stages in the development process, particularly in the case of more complex software packages.

According to an approach disclosed in a related application (U.S. patent application Ser. No. 11/388,445), "PROBABILISTIC SYSTEM FOR IDENTIFYING SOFTWARE DEVELOPMENT REGRESSIONS" filed on Mar. 24, 2006 and incorporated by reference as if fully set forth herein, a variety of historical data may be accessed. The historical data may include raw data, as well as analysis (e.g., calculations or probabilities) generated based upon the raw data. Examples of historical data include the number of errors generated by a particular portion of code, identities of users or groups of users responsible for generating and/or modifying the portion of code, and the platform or architecture on which a particular portion of code was tested. In some embodiments, the historical data comprises at least one of one or more source code files, one or more source code control logs, one or more integration requests, and one or more failure reports.

The historical data may be obtained over one or more software builds. From this information, it is possible to more accurately and efficiently identify portions of code that are likely to be problematic. In this manner, cumulative data may be used to identify causes of failures, even where the failure that has been introduced is not detected until a later date.

However, for a large system, over the years, source code in many files may have been written several times from inceptions of the files. Thus, the historical data may show many code components in the source code as potentially causing a regression in a later build. As a result, identifying a likely candidate becomes more and more time consuming as the volume of the historical data grows over the time.

In view of the above, a need exists for a tool that can efficiently make use of a large volume of historical data for the purpose of identifying a problem build that causes a software regression identified in a software system.

SUMMARY

An approach for efficiently making use of a large volume of historical data for the purpose of identifying a problem build that causes a software regression identified in a software system is described herein. According to one embodiment, it is determined that the software regression may have occurred in the software system. For example, the software regression may be absent from a particular previous build (e.g., a baseline build) but appears in a later build (e.g., a system integration build) of the software system.

In order to isolate the software regression to specific code change(s) in the software system, a set of candidate code components that may have caused the software regression may first be identified. Here each code component in the set may be identified on the basis that it has been changed since the particular previous build (i.e., the baseline build in the present example). Therefore, probabilistically speaking, such a code component (that has been changed since the baseline build) may be a cause for the software regression. Based on the historical data, a likelihood factor may be associated with the each code component. Such a likelihood factor indicates a likelihood that an associated code component caused the system regression detected in the build (i.e., the system integration build in the present example).

Likelihood factors associated with the set of candidate code components may be used to identify an intermediate build between the baseline build that does not have the software regression and the build in which the software regression has occurred. In one embodiment, a pre-intermediate build that just precedes the intermediate build is also identified. The intermediate build and the pre-intermediate build may be tested to see if the software regression exists in the intermediate build but does not exist in the pre-intermediate build. If that is the case, then the intermediate build is determined to be the particular build that caused the software regression.

However, if the software regression occurs in both the intermediate build and the pre-intermediate build, then the software regression may have been introduced in another intermediate build that is prior to the intermediate build tested. The historical data may be used again to identify which of the earlier intermediate builds is to be tested next. Once that next intermediate build is identified, its preceding build may also be identified. The previous steps relating to the intermediate build tested may be repeated for this next intermediate build.

On the other hand, if the software regression does not occur in either the intermediate build or the pre-intermediate build, then the software regression may have been introduced in a build (possibly also another intermediate build) that is after the intermediate build. The historical data may be used again to identify which of the later intermediate builds is to be tested next. Once that next intermediate build is identified, its preceding build may be also identified. The previous steps relating to the intermediate build testing may be repeated for this next intermediate build.

In this manner, a particular build that caused the software regression may be identified. Accordingly, a particular subset of code components (note that these code components are also in the set of candidate code components) that have been changed in this particular build may be identified as introducing the software regression. For the purpose of explanation, this particular subset of code components will be called a particular set of suspect code components. As a result, other code components that are in the set of candidate code components but not in the particular set of suspect code components may be excluded as code changes that caused the software regression. For the purpose of explanation, these other code components will be called a particular set of innocent code components.

In accordance with an embodiment of the present invention, for each code component in the particular set of innocent code components, its associated likelihood factor will be decreased. For each code component in the particular set of suspect code components, its associated likelihood factor will be still increased as a result of being identified as in the build that introduced the regression. By decreasing the likelihood factors of the innocent code components and increasing the likelihood factors of the suspect code components, the likelihood gap between these code components are widened. With the wider likelihood gap, the next time a similar regression is experienced, it is more apparent which code components are the more likely cause of the regression. The builds with changes to those code components can be tested before other builds, which enables the cause of the regression be found faster and with less testing.

In some embodiments, even before the process that identifies a particular build as introducing the regression is concluded, if the software regression is found not to occur in a combination of an intermediate build and its pre-intermediate build, for each code component in a set of code components comprising code components that have been changed since the baseline build, up to the intermediate build, its associated likelihood factor will be decreased. In some embodiments, the amount used in decrementing the likelihood factor of such a code component may be less pronounced than that used in decrementing a likelihood factor of a code component that has been conclusively determined as not related to the regression.

In this manner, those code components that are relatively frequently suspected as causing software regressions over time will have relatively large likelihood factors associated therewith, while other code components that are proven as not causing software regression over time will have relatively small likelihood factors associated therewith. Consequently, an aggregate likelihood factor (e.g., a sum of two more likelihood factors that are associated with two or more candidate code components in the set of candidate code components) in any particular build weighs more towards the suspect code components and less towards the innocent code components. A testing process that uses such a likelihood factor for the purpose of isolating a software regression to a particular problem build converges to the particular problem build more quickly than otherwise, thereby reducing overall system test time and lab usage.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF EMBODIMENT(S)

Techniques for efficiently making use of a large volume of historical data for the purpose of identifying a problem build that causes a software regression identified in a software system are described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Builds

Figure 1:
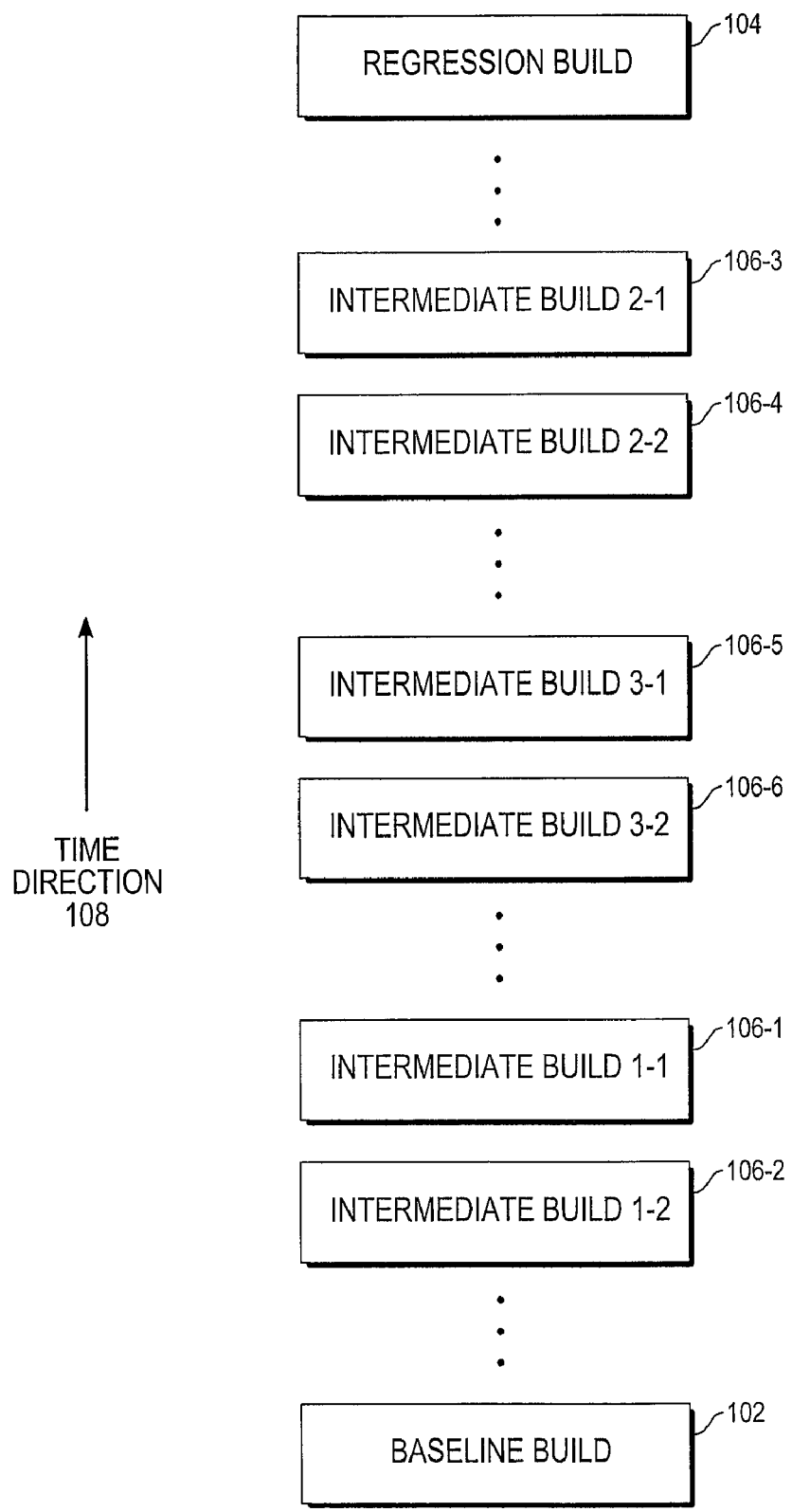
FIG. 1 is a diagram representing a baseline build, a regression build, and a number of intermediate builds there between, in accordance with an embodiment of the present invention.

FIG. 1 is a diagram that represents a baseline build 102 where a software regression is known to be absent from a software system, a regression build 104 in which the software regression in the software system has occurred, and a number of intermediate builds 1-1, 1-2, 2-1, 2-2, 3-1 and 3-2 (106-1 through 6) of the software system between the baseline build (102) and the regression build (104), in an example embodiment of the present invention. In one embodiment, the regression build may be a system integration build that contains all submitted code changes over a period of software development since the baseline build. An intermediate build 106 may be a nightly build that contains all submitted code changes since a previous nightly build or since the baseline build. For a software system that is concurrently developed or supported by a large number of development personnel, code changes may be numerous even between two nightly builds.

A build that is associated with a particular time point along a time direction 108 includes, up to that time point, all source code changes submitted to a source code control system that maintains a source code control history for the software system. Therefore, a software system image produced by such a build is equivalent no matter when such a build is physically made (or reproduced), since the build (e.g., made either today or ten days later) contains an identical set of software baseline source code components and submitted source code changes in the source code control system and produces an identical binary image.

As used herein, the term "software regression" refers to not only a functional failure, but may also refer to a performance problem, an aberration from past normal behaviors when interacting with other entities, etc.

Code Components

Figure 2:
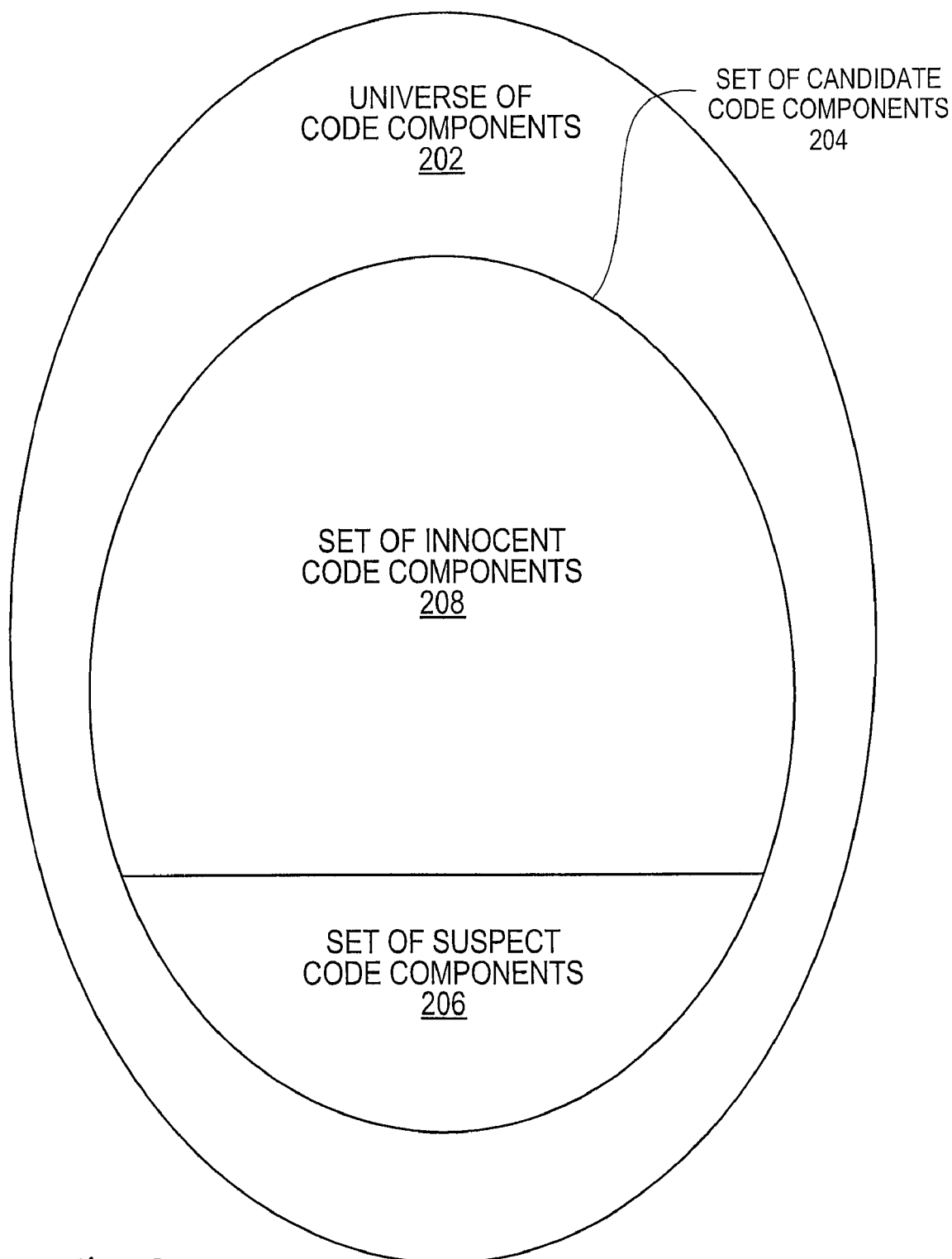
FIG. 2 is an example relationship diagram for code components in a software system, in accordance with an embodiment of the present invention.

FIG. 2 is a diagram that represents a universe of (source) code components 202 that comprises all source code components in the software system, including those code components that have been changed between the baseline build (102) and the regression build (104), and those that have not. As used herein, the term "code component" refers to a unit of software source code; such a unit of software source code may be a set of instructions in a programming language, a configuration file, a class, a method, a portion of a source code file, one or more source code files, one or more directories or subdirectories in a source code tree, a package of classes, etc. It should be noted that a code component may evolve over its life cycle. Thus, such a code component may contain a varying number of source code lines over time.

In the universe of code components 202, code components that have been changed between the baseline build (102) and the regression build (104) form a set of candidate code components 204. Before any particular build after the baseline build has been identified as a problem build, any code component in the set 204 may be considered a candidate for causing the software regression.

On the other hand, once a particular build is identified as a problem build, then the cause for the software regression in the software system can be further narrowed to code components that have been changed in this particular build. Those code components form a set of suspect code components 206, as illustrated in FIG. 2. As a result, code components that are in the set of candidate code components but not in the set of suspect code components are determined as not the cause for the software regression. Accordingly, these code components form a set of innocent code components 208, as illustrated in FIG. 2.

Probabilistic Model

In accordance with one embodiment of the invention, in order to methodically identify code components that are likely to be problematic, historical data is accessed. This historical data may be collected over one or more builds (for example, since the inception of the software system). From the historical data, a model such as a probability model may be generated.

For each code component in the software system, one or more "probabilities of failure" may be ascertained from the historical data. In some embodiments, this probability may be different for different types of regression; for example, a source file (which may be considered as a code component) may be a likely cause of networking regression but a very unlikely cause of memory management regression. Thus, for such a source file, there may be one or more probabilities of failure, each of which corresponds to a specific type of regression. In some embodiments, such a probability may be ascertained from the number of errors generated by the corresponding code component during one or more tests, as indicated by the historical data. However, it is important to note that some code components may be more error prone than others due to their complexity, or other reasons. Moreover, some code components may be fairly lengthy, while others may be fairly short. As a result, in some embodiment, it may be desirable to identify the number of errors generated per unit length of source code, such as the number of source code lines.

Although the probability of failure in this example is determined based upon the generation of errors by a particular code component, the probability of failure may be calculated using a variety of historical data. For instance, the probability of failure may take into account the user or set of users responsible for generating and/or modifying the set of instructions in the past. Other historical data such as that set forth herein may also be considered.

A variety of algorithms and calculations may be used to generate the probabilistic model from the historical data. Moreover, a weighting value may be assigned to various criteria in the historical data for use in such calculations. For instance, a weighting value or other indicator may indicate a complexity or difficulty of a corresponding code component. In other words, a weighting value or other indicator may be assigned to one or more code components to indicate their complexity or difficulty (or lack thereof). As another example, a weighting value may indicate the recency of the generation or modification of the corresponding code component. Such weighting values or indicators may be stored in the historical data.

Historical Data

The historical data that is collected may include raw data, as well as analysis of the collected data. The historical data may include one or more source code files including source code and/or associated source code changes. In addition, the historical data may include one or more logs such as a source code control log. A source code control log documenting the source code changes may identify the portion(s) of the source code that has been modified (e.g., added, deleted, and/or other modifications), as well as other associated data. The data may also include one or more integration requests. The log or integration requests may include a variety of information associated with source code changes. For instance, it may be desirable to identify a user or set of users responsible for the source code change, a geographical location of the user or set of users (e.g., group or organization), the date and/or time of the source code change, proximity of the change to the deadline (changes made under time pressure are more likely to contain bugs), or other information.

A failure (or bug) report that is generated may document errors or other failures. For instance, the failure report may document functional or performance problems by recording error messages, or other failures. Thus, the historical data may include one or more failure reports.

In accordance with one embodiment, a relationship between one or more of the above is identified. For instance, historical data may be used to map types of regressions (e.g., failure reports) to specific code changes using integration requests and/or source code control log files. Such a mapping may then be used to generate a probability model indicating probabilities of failures associated with various portions of code (e.g., files or groups of files).

The data that is collected during test sessions may include one or more of the types of data set forth above. However, it is important to note that the data set forth above is merely illustrative, and therefore other types of data may be collected and/or analyzed.

Example Implementation

To facilitate a complete understanding of the present invention, a specific sample implementation of a process will now be described. It should be noted that this sample implementation is provided for illustrative purposes only. It is not meant to be limiting or definitive. Many other implementations are possible and are within the scope of the present invention. In the following discussion, it will be assumed that a system test tool is used to isolate a software regression to a specific intermediate build. It will also be assumed that the software regression is introduced in a sequence of builds as shown in FIG. 1.

Aggregate Likelihood of Failure

In some embodiments, once the system test tool detects a regression in the regression build, the system test tool subsequently determines the nature/type of the regression. Using the probabilistic model that is generated based on the historical data, for each build, an aggregate likelihood that the regression (with the nature/type of the regression) is introduced in that build may be calculated. As will be further explained in detail, the system test tool can determine which intermediate build is the most likely to have caused the regression using the aggregate likelihoods for the builds.

For example, a number of candidate code components 204 may have been submitted in an intermediate build, say 106-1 of FIG. 1. As a result, these code components have been changed. As used herein, the term "changed" refers to modification, addition, or deletion of source code, source code file, methods, data, macros, classes, etc. The system test tool can use the probability model to calculate an (individual) likelihood of failure with respect to each of the candidate code components (204) in the intermediate build (e.g., 106-1). Based on all the individually predicted likelihood of failure for each of the candidate code components (204), the system test tool can calculate an aggregate likelihood of failure for the intermediate build (106-1) by simple summation of the individual likelihoods. For example, the system test tool may obtain an aggregate likelihood of failure for intermediate build 1-1 (i.e., 106-1) as 0.4.

Likewise, the system test tool may obtain an aggregate likelihood of failure for each of the intermediate builds (106) between the baseline build (102) and the regression build (104). For example, intermediate build 2-1 may have an aggregate likelihood of 0.3.

Select an Intermediate Build

In some embodiments, instead of using a brute-force binary chop selection mechanism, the system test tool selects an intermediate build (106) for testing, taking into consideration all aggregate likelihoods of failure that are associated with the intermediate builds. In a particular embodiment, the system test tool selects a build whose aggregate likelihood of failure is of the highest value among those of all the intermediate builds (106). In various embodiments, each intermediate build (106) may be associated with an aggregate likelihood of failure, either all normalized (i.e., the sum of all aggregate likelihoods of failure for all the intermediate builds is 1), or all non-normalized (i.e., the sum of all aggregate likelihoods of failure for all the intermediate builds may not be 1, but a higher aggregate likelihood of failure still indicates a larger probability of introducing the regression than another lower aggregate likelihood).

For example, if intermediate build 1-1 (106-1) has an aggregate likelihood of failure as 0.4, and if all other intermediate builds 106 have aggregate likelihoods of failure as less than 0.4, then the system test tool selects intermediate build 1-1 as the first build to test for the purpose of determining whether the selected build introduces the software regression. As used herein, the term "the selected build introduces" means that the software regression is first brought into the software system or the source code control system in the selected build.

In one embodiment, a pre-intermediate build that just precedes a selected intermediate build is also identified. For example, when intermediate build 1-1 is identified as the most likely build that introduces the regression, an intermediate build 1-2 that just precedes the selected intermediate build (i.e., intermediate build 1-1) may also be identified. Like the selected intermediate build, the pre-intermediate build may be another intermediate build such as a nightly build that comprises many candidate code components (204).

The selected intermediate build and its pre-intermediate build (106-1 and 106-2 of FIG. 1) may be tested to see if the software regression exists in the selected intermediate build (106-1 of FIG. 1) but does not exist in the pre-intermediate build (106-2 of FIG. 1). If that is the case, then the selected intermediate build is determined to be the particular intermediate build that caused the software regression.

On the other hand, if it is found that both the selected intermediate build and its pre-intermediate build (106-1 and 106-2 of FIG. 1) exhibit the software regression, then the software regression must be in an earlier build than the selected intermediate build (106-1).

Conversely, if it is found that both the selected intermediate build and its pre-intermediate build (106-1 and 106-2 of FIG. 1) exhibit an absence of the software regression, then the software regression must be in a later build than the selected intermediate build (106-1).

Select Next Intermediate Build

For the purpose of explanation, the system test tool determines that the selected intermediate build does not introduce the software regression. To select next intermediate build (106) for the purpose of testing for the origin of the regression, the system test tool may exclude all the intermediate builds up to the selected intermediate build that has just been tested. In a particular embodiment, the system test tool selects a build whose aggregate likelihood of failure is of the highest value among those of all the remaining intermediate builds (106). For example, if intermediate build 2-1 (106-3) has an aggregate likelihood of failure as 0.35, and if all other remaining intermediate builds 106 have aggregate likelihoods of failure as less than 0.35, then the system test tool selects intermediate build 2-1 as the next build to test for the purpose of determining whether this newly selected build introduces the software regression.

As before, a pre-intermediate build that just precedes the newly selected intermediate build may be identified. An intermediate build 2-2 that just precedes the newly selected intermediate build (i.e., intermediate build 2-1) may also be identified. Like the newly selected intermediate build, this new pre-intermediate build may be another intermediate build such as a nightly build that comprises many candidate code components (204).

The newly selected intermediate build and its pre-intermediate build (106-3 and 106-4 of FIG. 1) may be tested to see if the software regression exists in the newly selected intermediate build (106-3 of FIG. 1) but does not exist in its pre-intermediate build (106-4 of FIG. 1). If that is the case, then the newly selected intermediate build is determined to be the particular intermediate build that caused the software regression.

However, if it is found that both the newly selected intermediate build and its pre-intermediate build (106-3 and 106-4 of FIG. 1) exhibit an absence of the software regression, then the software regression must be in a later build than the newly selected intermediate build (106-3).

Conversely, if it is found that both the newly selected intermediate build and its pre-intermediate build (106-3 and 106-4 of FIG. 1) exhibit the software regression, then the software regression must be in an earlier build than the newly selected intermediate build (106-3).

Isolate to an Intermediate Build

For the purpose of explanation, the system test tool determines that an earlier build than the newly selected intermediate build (106-3) introduces the software regression. To select next intermediate build for the purpose of testing for the origin of the regression, the system test tool may exclude this newly selected intermediate build that has just been tested from being a candidate for the next intermediate build. In a particular embodiment, the system test tool selects a build whose aggregate likelihood of failure is of the highest value among those of all the remaining intermediate builds (which now do not include 106-3 but still includes 106-4, in the present example). For example, if intermediate build 3-1 (106-5) has an aggregate likelihood of failure as 0.30, and if all other remaining intermediate builds 106 have aggregate likelihoods of failure as less than 0.30, then the system test tool selects intermediate build 3-1 as the next build to test for the purpose of determining whether this newly selected build introduces the software regression.

In this manner, the above described process may be repeated until an intermediate build that introduces the regression is identified among all the intermediate builds (106-1 through 6 plus all other intermediate builds denoted by the dots in FIG. 1) between the baseline build and the regression build of FIG. 1.

Example Operation

Figure 3A:
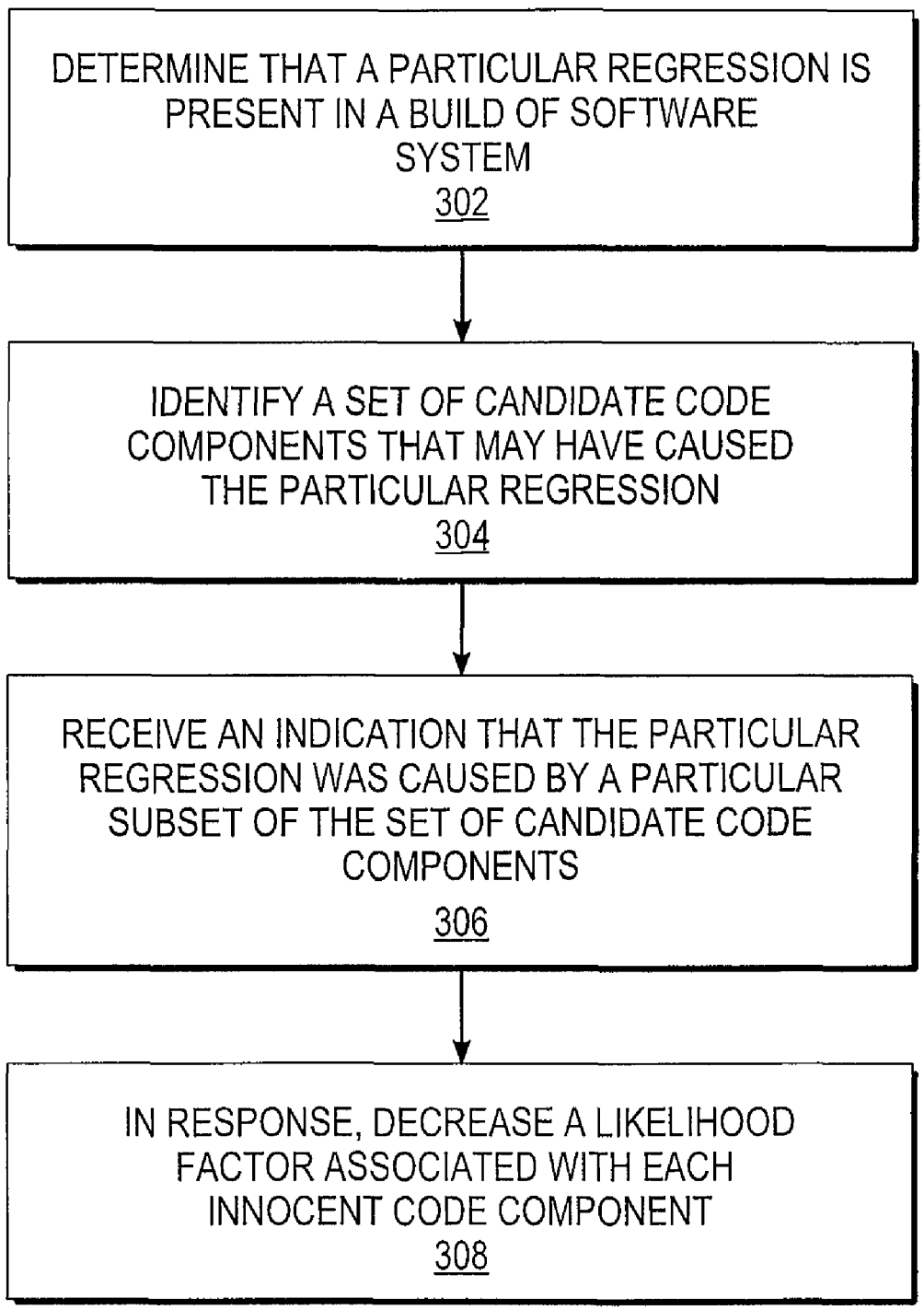
FIG. 3A and FIG. 3B are example process flows, in accordance with an embodiment of the present invention.

FIG. 3A illustrates an example process, in accordance with an embodiment of the present invention. The example process may be implemented by an automated system test tool in some embodiments. Initially, in block 302, the system test tool determines that a particular regression is present in a particular build (which may be, for example, the regression build 104 of FIG. 1) of a software system. For example, results recorded in logs of one or more system tests may be compared with the expected results of the system tests. One or more deviations of the test results from the expected results may be considered as a regression.

A regression may be characterized in different ways. For example, a regression may be characterized as a functionality failure while another regression may be characterized as performance degradation. A regression may also be characterized by to which area of code (stored in the source code control system) the regression is related. For example, a regression may be related to a specific part of the software system under test, such as TCP.

Based on the historical data and characterization information (as described above) of the regression, in block 304, the system test tool may identify a set of candidate code components that may have caused the particular regression in the particular build. In some embodiments, all code components that have been changed since a particular previous build (which is the baseline build 102 of FIG. 1 in the present example) of the software product are all identified as members of the set of candidate code components. In some other embodiments, only those in the above identified components that are considered as relevant based on the historical data are included in the set of candidate code components. Other code components that have not caused a regression of similar characteristics to those of the particular regression may be excluded.

In accordance with an embodiment of the present invention, each code component in the set of candidate code components can be adapted for performing a set of one or more functions. For example, an internet protocol related code component such as one or more source files may be edited or created (i.e., adapted) by a developer to perform a new function such as supporting IP v6.

In some embodiments, the historical data is accessed for each code component in the set of candidate code components. Here, the historical data may be obtained over one or more software builds, for example, over several months, years, or decades. Based on the historical data, each code component in the set of candidate code components has a likelihood factor associated with each such code component. The likelihood factor indicates a likelihood that that (i.e., the associated) code component caused the particular regression. In a particular embodiment, the likelihood factor indicates recency of generation or modification of an associated code component.

In block 306, the system test tool receives an indication that the particular regression was caused by a set of suspect code components. Here, the set of suspect code components are contained in the set of candidate code components. In some embodiments, the set of suspect code components are code components that are changed in an intermediate build that first introduces the regression. Therefore, in these embodiments, the set of suspect code components is not identified until it is determined that the software regression is first introduced in a build comprising the set of suspect code components. Put another way, the build that introduced the regression is identified. The code components that have changed in that build are the suspect code components.

In some embodiments, the system test tool accesses the historical data associated with a plurality of code components that make up most or all of the code for the software system. The historical data may indicate a complexity or difficulty of one or more corresponding code component in the set of candidate code components and past history of regressions in these code components. The historical data may indicate a set of one or more individuals responsible for generating or modifying one or more corresponding code component in the set of candidate code components. Additionally and/or optionally, the historical data may indicate a geographical region of a set of one or more individuals responsible for generating or modifying one or more corresponding code component in the set of candidate code components. The historical data may indicate at least one of a date, time and proximity to deadline of generation or modification of one or more corresponding code component in the set of candidate code components. In a particular embodiment, the historical data may indicate a number of errors generated with respect to number of lines of code in one or more corresponding code component in the set of candidate code components. The historical data associated with each of the plurality of sets of software instructions may also indicate at least one of an architecture and platform on which the corresponding set of software instructions was tested.

In response to receiving the indication that the particular regression was caused by the set of suspect code components, in block 308, for each candidate code component in the set of candidate code components that is not in the set of suspect code components, the system test tool decreases a likelihood factor associated with that candidate code component. In some embodiments where each code component has more than one likelihood associated with it (likelihood of causing a networking error, a likelihood of causing a memory error, etc.), the likelihood that is decreased is the likelihood that the code component caused this type of regression. For example, the system test tool may set a new value of the likelihood factor as a numeric factor times the old value of the likelihood factor. This numeric factor may be 0.5, ⅔, etc. In some embodiments, the numeric factor is user configurable. In some embodiments, such a numeric factor is set, depending on what the code component is, what software module the code component is located, etc.

In some embodiments, in response to receiving the indication that the particular regression was caused by the set of suspect code components, for each code component in the set of suspect code component, the system test tool further increase a likelihood factor associated with that suspect code component. In some embodiments where each code component has more than one likelihood associated with it (likelihood of causing a networking error, a likelihood of causing a memory error, etc.), the likelihood that is increased is the likelihood that the code component caused this type of regression. For example, as in the case of decrementing, to increment the likelihood factor, the system test tool may set a new value of the likelihood factor as a numeric factor times the old value of the likelihood factor. This numeric factor may be 1.25, 1.5, etc. In some embodiments, the numeric factor is user configurable and may be set depending on what the code component is, what software module the code component is located, etc.

Figure 3B:
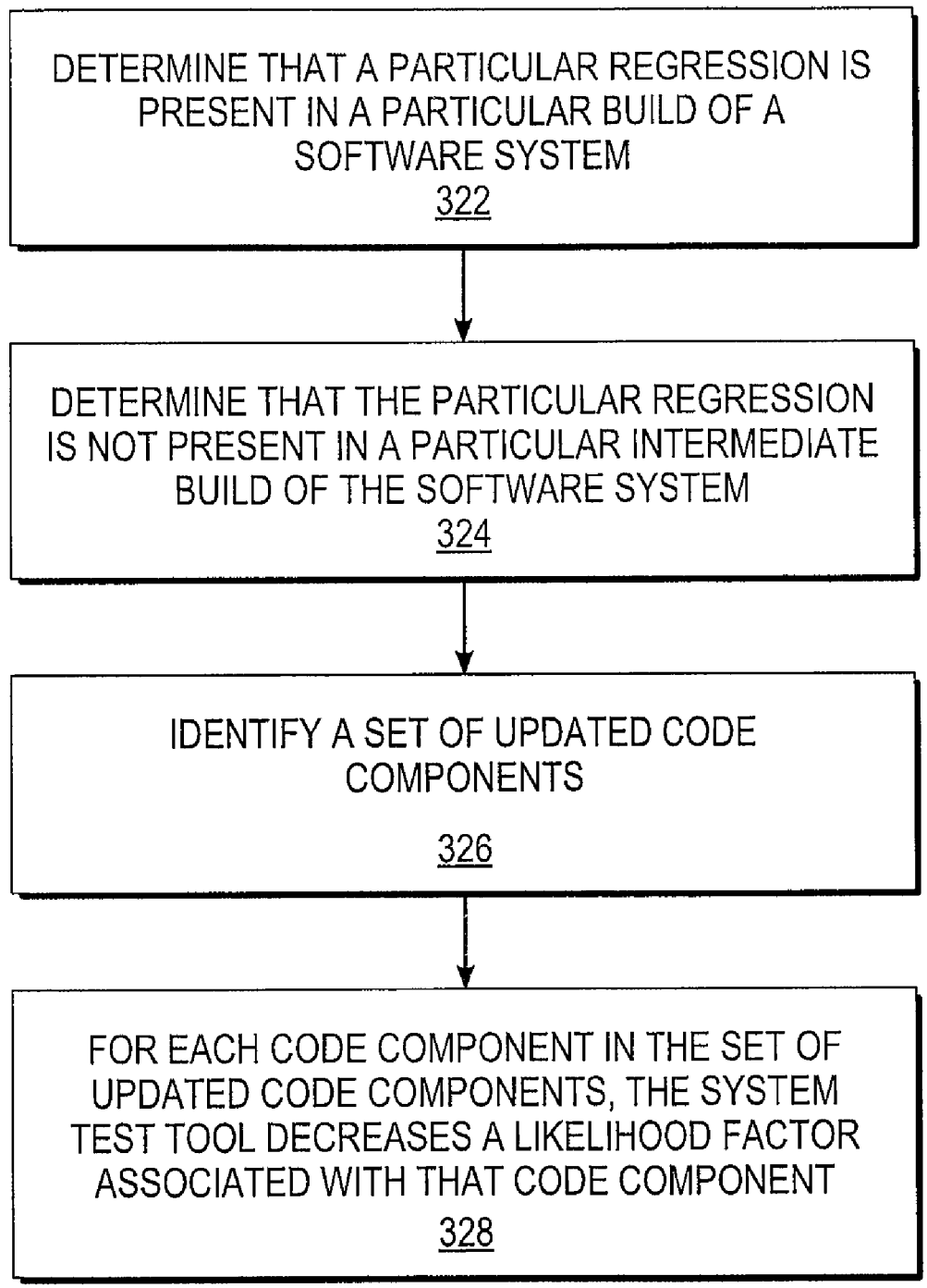

FIG. 3B illustrates another example process flow, in accordance with an embodiment of the present invention. In block 322, the system test tool determines that a particular regression is present in a particular build (for example, the regression build 104 of FIG. 1) of a software system. In block 324, the system test tool determines that the particular regression is not present in a particular intermediate build (for example, any of the intermediate builds 106 of FIG. 1) of the software system. Here, the particular intermediate build is between a particular previous build of the software system and the particular build, and may be selected for testing in accordance with an order generated using historical data.

In step 326, the system test tool identifies a set of updated code components. Here, each code component in the set of updated code components, up to the particular intermediate build, has been changed since the particular previous build, and has a likelihood factor associated therewith each such code component indicating the likelihood that that code component caused the particular regression.

In step 328, for each code component in the set of updated code components, the system test tool decreases a likelihood factor associated with that code component. As before, in some embodiments where each code component has more than one likelihood associated with it (likelihood of causing a networking error, a likelihood of causing a memory error, etc.), the likelihood that is decreased is the likelihood that the code component caused this type of regression.

For the purpose of illustration, intermediate builds between the baseline build and the regression build have been described as containing six intermediate builds or more (as indicated by the dots of FIG. 1). It should be noted that this is illustration only. For the purpose of this invention, more or fewer intermediate builds are possible. For example, there may be one intermediate build between the baseline build and the regression build. Thus, all variations of the number of intermediate builds are within the scope of this invention.

Hardware Overview

Figure 4:
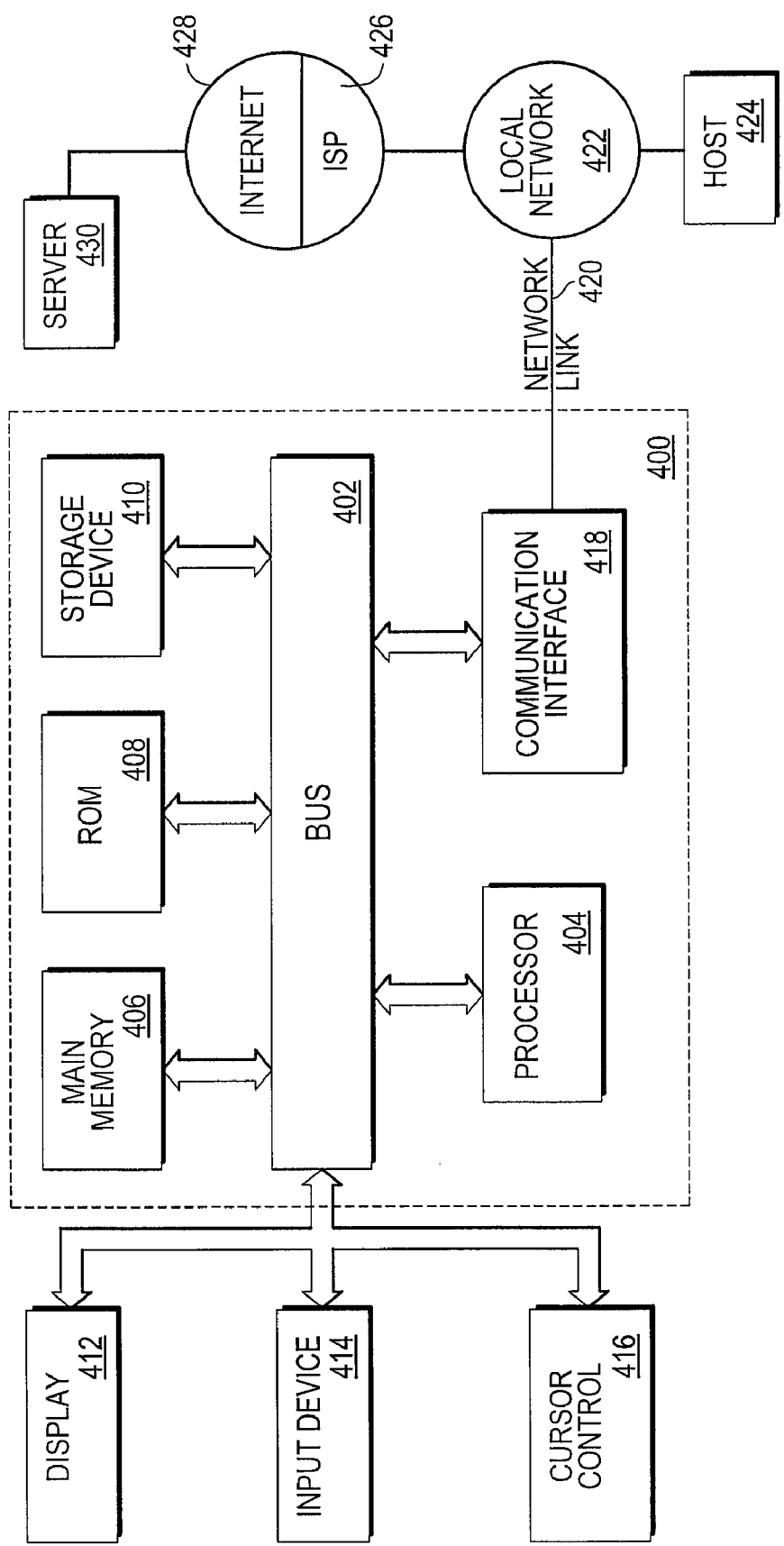
FIG. 4 is a block diagram that illustrates a computer system upon which an embodiment in accordance with the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for the tools and techniques described herein. According to one embodiment of the invention, tools and techniques are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for techniques as described herein.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
    generating, by a computer processor, a probability model for a software system comprising a plurality of code components, wherein the probability model assigns a probability value, defining a calculated probability of causing at least one regression, to each code component of the plurality of code components;
    determining, using the probability model, that a particular regression is present in a particular build of the software system;
    identifying, by the computer processor, from the plurality of code components in the particular build, a set of candidate code components based on each candidate code component in the set of candidate code components being changed since a previous build, wherein each code component in the set of candidate code components is adapted for performing a set of one or more functions;
    receiving an indication that the particular regression was caused by a set of suspect code components, wherein the set of suspect code components are contained in the set of candidate code components;
    identifying, by the computer processor, a set of non-suspect code components based on each non-suspect code component in the set of code components being in the set of candidate code components and not in the set of suspect code components;
    decreasing, by the computer processor, in response to receiving the indication, the probability value assigned to each non-suspect code component by a numeric factor; and
    isolating, after decreasing, the particular regression to a code component in the set of candidate code components using the probability value assigned to each candidate code component.

2. The method of claim 1, further comprising, in response to receiving the indication that the particular regression was caused by the set of suspect code components, increasing the probability value assigned to each suspect code component.

3. The method of claim 1, further comprising:
    accessing historical data associated with the plurality of code components;
    identifying one or more of the plurality of code components from the historical data; and
    testing one or more of the identified one or more of the plurality of code components.

4. The method as recited in claim 1, wherein historical data is accessed for each candidate code component in the set of candidate code components.

5. The method as recited in claim 1, wherein historical data is accessed for each candidate code component in the set of candidate code components, and wherein the historical data is obtained over one or more software builds.

6. The method as recited in claim 1, wherein the set of suspect code components is not identified until a determination is made that the software regression is first introduced in a build comprising the set of suspect code components.

7. The method as recited in claim 1, further comprising testing one or more intermediate builds in accordance with an order generated using historical data.

8. The method as recited in claim 1,
    wherein receiving an indication that the particular regression was caused by a set of suspect code components includes testing one or more intermediate builds using the probability model.

9. The method as recited in claim 8, wherein the historical data comprises at least one of one or more source code files, one or more source code control logs, one or more integration requests, and one or more failure reports.

10. The method as recited in claim 8, wherein the historical data indicates a set of one or more individuals responsible for generating or modifying one or more corresponding candidate code component in the set of candidate code components.

11. The method as recited in claim 8, wherein the historical data indicates a geographical region of a set of one or more individuals responsible for generating or modifying one or more corresponding candidate code component in the set of candidate code components.

12. The method as recited in claim 8, wherein the historical data indicates a complexity or difficulty of one or more corresponding candidate code component in the set of candidate code components.

13. The method as recited in claim 8, wherein the historical data indicates at least one of a date, time and proximity to deadline of generation or modification of one or more corresponding candidate code component in the set of candidate code components.

14. The method as recited in claim 8, wherein the historical data indicates a number of errors generated with respect to number of lines of code in one or more corresponding candidate code component in the set of candidate code components.

15. The method as recited in claim 8, wherein the historical data associated with each of the plurality of code sets indicates at least one of an architecture and a platform on which a corresponding code set was tested.

16. The method as recited in claim 1, wherein the probability value indicates recency of generation or modification of an associated code component.

17. A non-transitory machine-readable medium comprising:
- instructions for generating a probability model for a software system comprising a plurality of code components, wherein the probability model assigns a probability value, defining a calculated probability of causing at least one regression, to each code component of the plurality of code components;
- instructions for determining, using the probability model, that a particular regression is present in a particular build of the software system;
- instructions for identifying, from the plurality of code components in the particular build, a set of candidate code components based on each candidate code component in the set of candidate code components being changed since a previous build, wherein each code component in the set of candidate code components is adapted for performing a set of one or more functions;
- instructions for receiving an indication that the particular regression was caused by a set of suspect code components, wherein the set of suspect code components are contained in the set of candidate code components;
- instructions for identifying a set of non-suspect code components based on each non-suspect code component in the set of code components being in the set of candidate code components and not in the set of suspect code components;
- instructions for decreasing, in response to receiving the indication, the probability value assigned to each non-suspect code component by a numeric factor; and
- instructions for isolating, after decreasing, the particular regression to a code component in the set of candidate code components using the probability value assigned to each candidate code component.

* * * * *